United States Patent [19]

Grassl

[11] Patent Number: 4,733,847
[45] Date of Patent: Mar. 29, 1988

[54] SPRUNG VEHICLE SEAT

[75] Inventor: Johann Grassl, Schwandorf, Fed. Rep. of Germany

[73] Assignee: Grammer Sitzysteme GmbH, Amberg, Fed. Rep. of Germany

[21] Appl. No.: 855,438

[22] Filed: Apr. 24, 1986

[30] Foreign Application Priority Data

May 15, 1985 [DE] Fed. Rep. of Germany ....... 3517505

[51] Int. Cl.⁴ ............................................. F16M 13/00
[52] U.S. Cl. .................................. 248/550; 248/631; 297/345
[58] Field of Search .............. 248/550, 563, 631, 636, 248/567, 564, 562, 588; 297/345, 347, 339; 180/282; 267/117, 114, DIG. 1, DIG. 2

[56] References Cited

U.S. PATENT DOCUMENTS

| | | | |
|---|---|---|---|
| 3,150,855 | 9/1964 | Carter et al. | 248/550 |
| 3,325,136 | 6/1967 | Radke et al. | 248/631 X |
| 3,430,444 | 3/1969 | Kamp | 248/631 X |
| 3,470,692 | 10/1969 | Kamp | 267/117 |
| 3,638,897 | 2/1972 | Harder | 267/117 X |
| 3,951,373 | 4/1976 | Swenson | 248/550 |
| 3,954,245 | 5/1976 | Costin | 248/631 X |
| 3,990,668 | 11/1976 | Thompson et al. | 248/550 |
| 4,198,025 | 4/1980 | Lowe | 248/550 |
| 4,213,594 | 7/1980 | Pietsch | 248/550 |
| 4,397,440 | 8/1983 | Hall et al. | 248/550 |
| 4,461,444 | 7/1984 | Grassl et al. | 248/550 |

Primary Examiner—J. Franklin Foss
Attorney, Agent, or Firm—Elliot M. Olstein; Raymond J. Lillie

[57] ABSTRACT

In a sprung vehicle seat including a gas spring arrangement disposed between a seat carrier frame and a base frame, the gas spring arrangement includes a valve assembly for adjusting the pressure in a gas spring in response to the weight of the seat occupant (weight adjustment) and in dependence on the desired seat height (height adjustment). The valve assembly has a first valve means for weight adjustment and a second valve means for height adjustment, being separate from and manually operable independently of the first valve means. For weight adjustment, the seat also includes an actuator connected to the seat carrier frame and actuable for controlling the pressure in the gas spring, in dependence on the height of the seat carrier frame. A coupling means operatively connects the actuator to the seat carrier frame selectively at a plurality of different operative positions.

4 Claims, 5 Drawing Figures

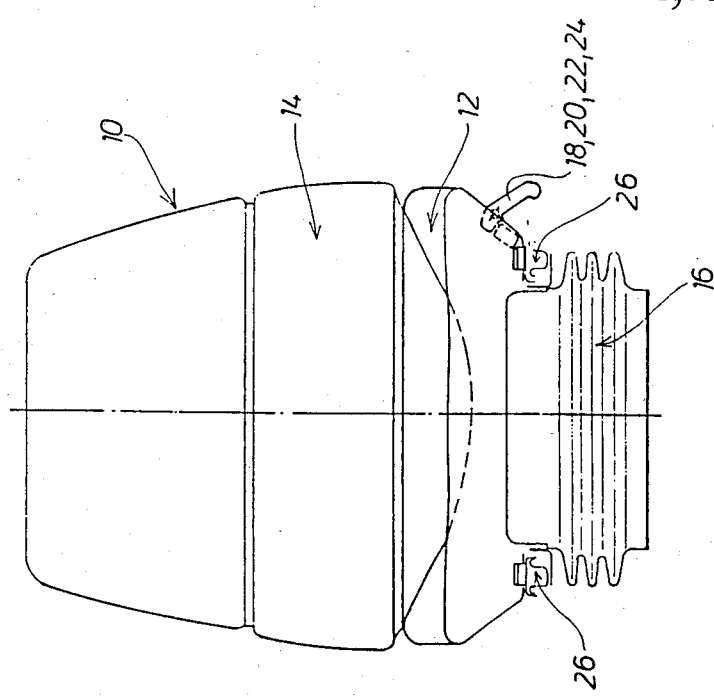
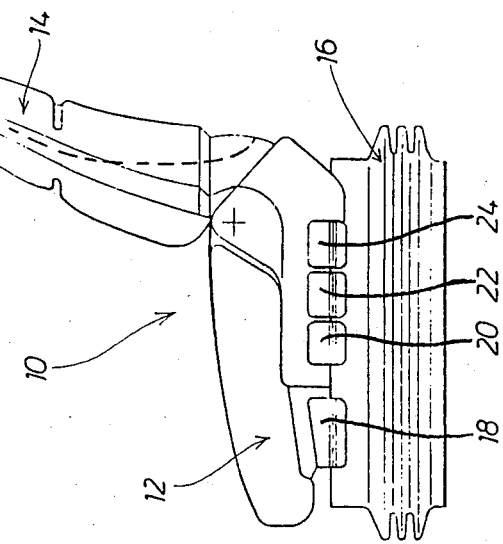

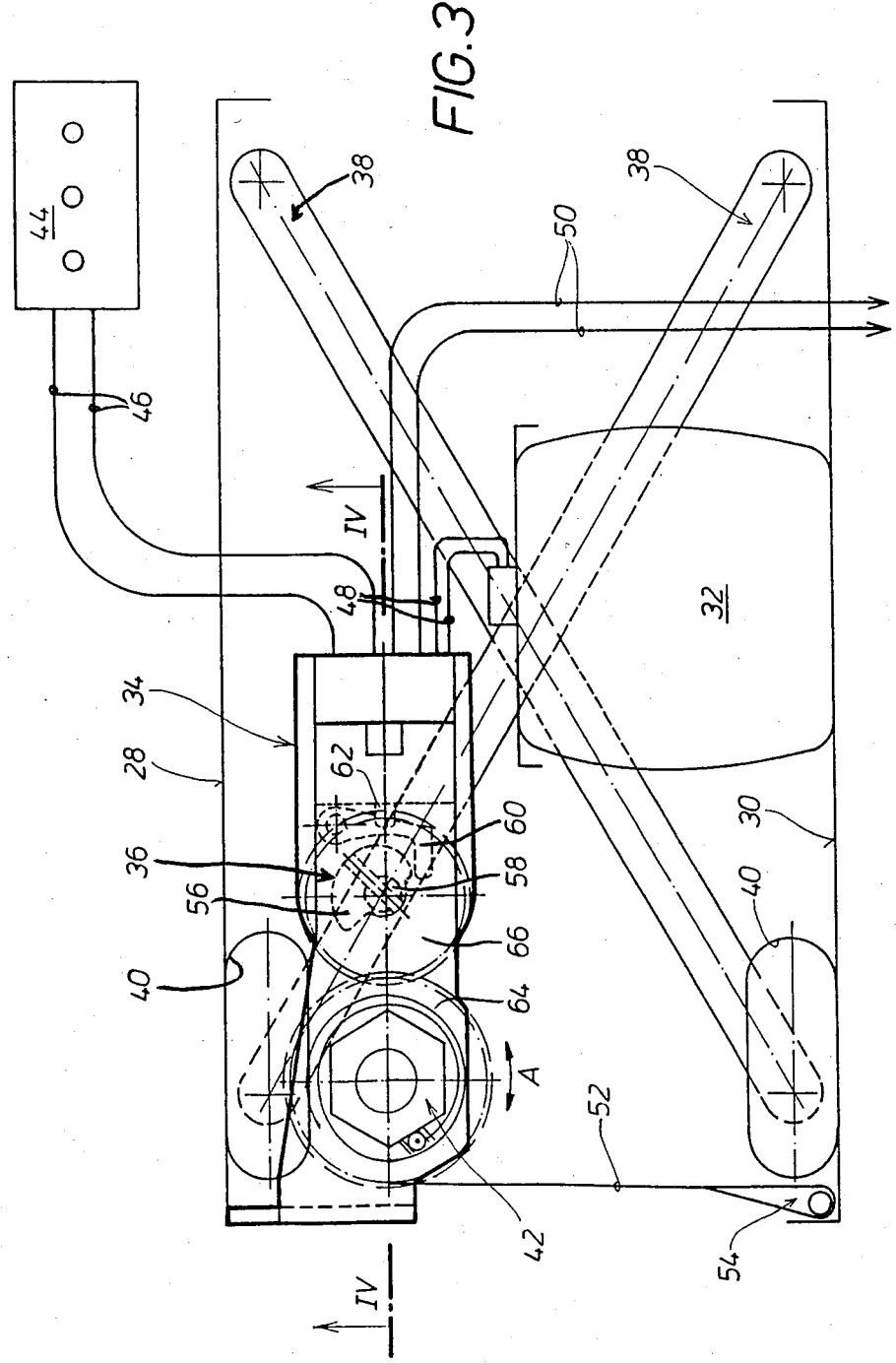

SPRUNG VEHICLE SEAT

BACKGROUND OF THE INVENTION

In one form of sprung vehicle seat, as disclosed in German laid-open application (DE-OS) No. 30 43 117, the seat comprises a gas spring disposed between a base frame and a seat carrier frame, with the actual seat being carried on the seat carrier frame. The vehicle seat further comprises a valve assembly for adjusting the pressure in the gas spring in dependence on the weight of the occupant (weight adjustment) and in dependence on the desired seat height (height adjustment). For the purposes of adjustment to the weight of the occupant, the seat has a sender or actuator unit which is connected to the seat carrier frame and which is displaceable or rotatable in dependence on the seat height in relation to actuating switch devices for the gas spring. A coupling arrangement is provided between the seat carrier frame and the actuator device, to permit that device to be connected to the seat carrier frame at different spacings, for the purposes of providing the seat height adjustment. The actuator comprises a tooth configuration which extends along a straight line while the seat carrier frame is provided with a tooth arrangement which corresponds to and co-operates with the tooth arrangement on the actuator. By virtue of those tooth arrangements, the actuator can be displaced by respective distances which correspond to the pitch of the tooth arrangements. The magnitude of the tooth pitch depends on the mechanical strength required in respect of the coupling between the seat carrier frame and the actuator. As, with that coupling configuration, it may happen, as from a given seat height, that is no longer the case that all the teeth of the actuator are engaged with all the teeth on the seat carrier frame, it is necessary for the teeth to be of a given minimum size, for reasons of an adequate level of mechanical strength. That minimum tooth size has such an effect on the tooth pitch that the steps or graduations in which the height of the seat carrier frame relative to the base frame can be adjusted cannot be less than a given minimum value. As the actuating arrangement for setting a desired seat height in that vehicle seat structure is joined to the actuator, the actuating arrangement for setting the seat height must be disposed in the vicinity of the actuator.

SUMMARY OF THE INVENTION

An object of the present invention is to provide a sprung vehicle seat which provides for ready adjustment in respect of seat height and in dependence on the weight of an occupant of the seat.

Another object of the present invention is to provide a sprung vehicle seat including an actuating means for seat height adjustment, which can be disposed at a location on the seat that is readily accessible to the occupant thereof.

Still another object of the present invention is to provide a sprung vehicle seat adapted to provide adjustment in respect of height and in dependence on occupant weight, which is of a compact and reliable design.

Yet another object of the present invention is to provide a vehicle seat suspension arrangement including a means for adjustment in response to occupant weight and means which provide for seat height adjustment that is readily accessible to the seat occupant irrespective of the location of the occupant weight adjustment means.

These and other objects are achieved by a sprung vehicle seat comprising a base frame, a seat carrier frame which is displaceable in relation to the base frame and a gas spring operatively disposed between the seat carrier frame and the base frame. A valve assembly is provided for adjusting the pressure in the gas spring in dependence on the weight of the seat occupant and to provide the desired seat height, the valve assembly comprising a first valve means to give said weight adjustment, a second valve means for giving said height adjustment, with the second valve means being separate from and operable independently of the first valve means, and an actuating member for manually actuating the second valve means. The seat construction further includes an actuator for the purposes of weight adjustment, connected to the seat carrier frame and actuable in dependence on seat height to operate the second valve means of the valve assembly. A coupling means is operatively disposed between the seat carrier frame and the actuator, to couple the actuator to the seat carrier frame at a plurality of different positions, dependent on occupant weight.

By virtue of the valve assembly comprising two mutually separate, independent valve means, it is possible for the actuating member for manually actuating the second valve means, to provide the height adjustment, to be arranged at such a location that it is readily accessible, irrespective of the location of the valve means for providing for weight adjustment. The valve means for weight and height adjustment may be hydraulic valves or preferably pneumatic valves.

The actuator is preferably in the form of a cam shaft, that construction providing the advantage that any linear heightwise movement of the seat carrier frame which is converted into an angular movement of the cam shaft permits accurate control of the two valve means, that is to say the valve means for weight adjustment and the valve means for height adjustment.

In an advantageous embodiment of the structure according to the invention, it has been found desirable for a belt winding or retractor device to be operatively disposed between the seat carrier frame and the actuator. With such a belt device which is constructed as described for example in co-pending patent application U.S. Ser. No. 06/855,439, any heightwise movement of the seat carrier frame relative to the base frame is converted into a relatively large angular motion which is transmitted selectively to the actuator in dependence on the position of the coupling means.

The coupling means is preferably disposed between the belt mechanism and the actuator, comprising coaxial gears in a fine tooth pitch. The coupling means may comprise a gear with an external tooth configuration and two gears each with an internal tooth configuration corresponding to the external tooth configuration of the first-mentioned gear and co-operable selectively therewith, thus giving the advantage that the gears are continuously in engagement with each other over the entire length of their tooth arrangements so that high levels of mechanical torque can be transmitted even with a comparatively fine tooth pitch and with small teeth on the gears. The fine tooth pitch also provides the advantage that the coupling means can be adjusted in small angular steps corresponding to the fine tooth pitch of the teeth on the gears.

In an advantageous embodiment, the coupling means may comprise a pneumatic coupling means which can be put into fluidic communication with the valve means for height adjustment. Such a design of coupling means permits the pressure source which is provided for the gas spring, also to be used for actuation of the coupling means. That source may be for example a compressor unit or the general power system on the vehicle in which the seat is used.

Further objects, features and advantages of the present invention will be apparent from the following description of a preferred embodiment thereof.

BRIEF DESCRIPTON OF THE DRAWINGS

FIG. 1 is a side view of a vehicle seat in accordance with the principles of the present invention, FIG. 2 is a front view of the vehicle seat shown in FIG. 1, FIG. 3 is a diagrammatic side view of part of the vehicle seat showing major components thereof, FIG. 4 is a view in section taken along line IV—IV in FIG. 3, and FIG. 5 shows a circuit diagram of the vehicle seat structure.

DESCRIPTION OF THE PREFERRED EMBODIMENT

Figure 4:
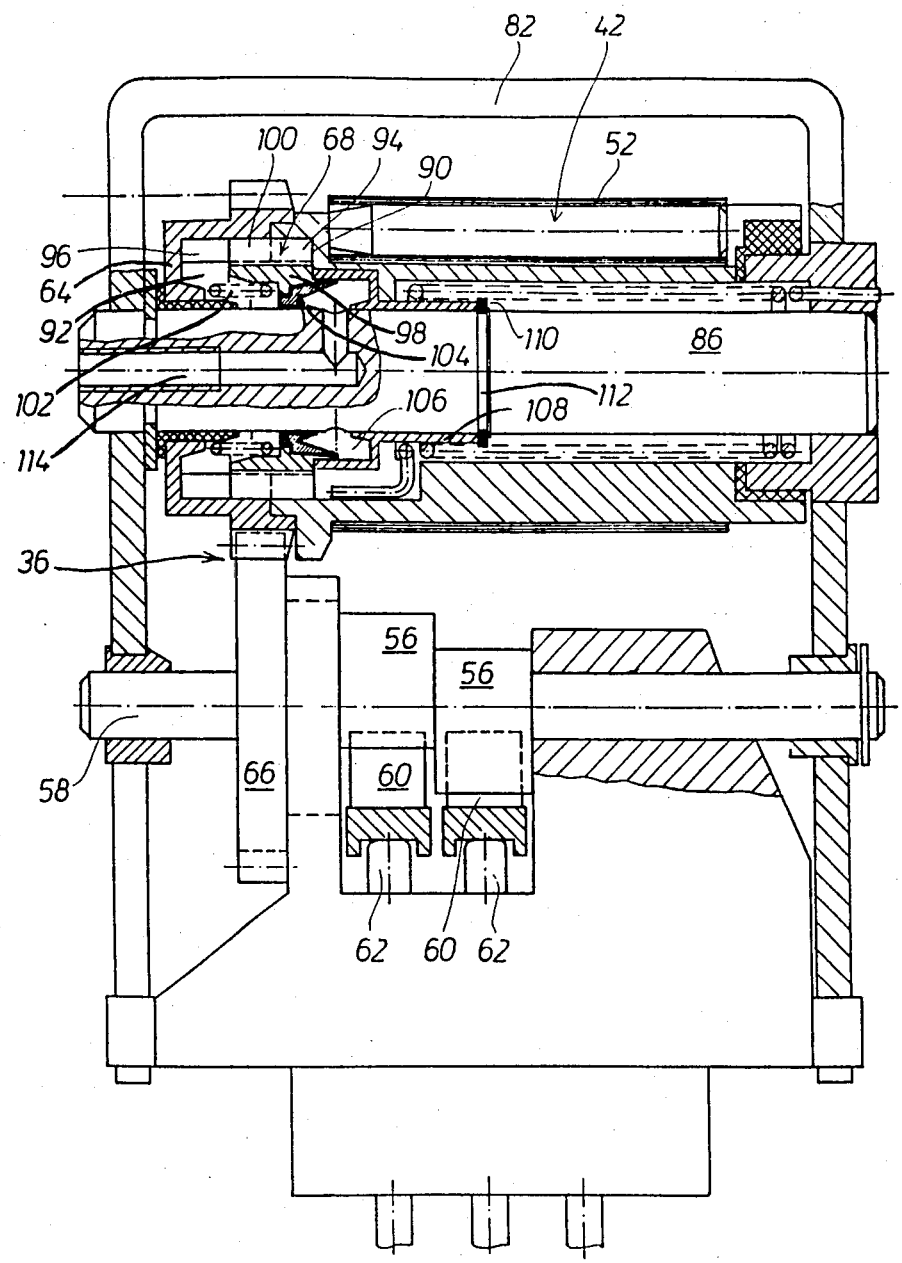

Referring firstly to FIGS. 1 and 2, shown therein is a sprung vehicle seat comprising a seat portion 12 and a backrest portion 14. The seat portion 12 is disposed on a support means or sprung suspension arrangement 16 comprising a seat carrier frame (referenced at 28 in FIG. 3) and a base frame (referenced at 30 in FIG. 3). A gas spring (referenced at 32 in FIG. 3) is operatively disposed between the seat carrier frame and the base frame. The vehicle seat 10 is provided on one side thereof with actuating members 18, 20, 22 and 24 of which the actuating member 22 is provided for adjustment in respect of height of the seat portion 12. The actuating member 18 serves for adjusting the angle of inclination of the seat portion 12 and the actuating member 20 is provided for adjustment of the vehicle seat 10 in the longitudinal or fore-and-aft direction. The actuating member 24 which is disposed in the direct vicinity of the actuating member 22 is provided for adjustment of the angle of inclination of the backrest portion 14 relative to the seat portion 12. Displacement of the vehicle seat 10 in the longitudinal direction is produced by means of longitudinal rails 26 (see FIG. 2) on the two sides of the vehicle seat support means 16.

Reference will now be made to FIG. 3 which shows the individual components of the sprung vehicle seat, which are provided in the support arrangement 16, with a gas spring 32 operatively disposed between the seat carrier frame 28 and the base frame 30, and a valve assembly 34 for adjusting the pressure in the gas spring 32. For the purpose of altering the gas spring pressure, the valve assembly 34 comprises a valve means (not referenced) for seat height adjustment and a second valve means 36 which is independent and separate from the height adjustment valve means, for adjustment of the seat carrier frame 28 relative to the base frame 30, in dependence on the weight of the occupant of the seat. Two scissor-type support assemblies 38 are operatively disposed between the seat carrier frame 28 and the base frame 30. The support arrangements 38 are rotatably mounted at one end of their respective limbs to the two frames 28 and 30 while their two oppositely disposed ends are mounted to the frames 28 and 30 in such a way as to be displaceable in the longitudinal direction thereof. The displaceable mounting of the second-mentioned ends of the support arrangements 38 is indicated diagrammatically by the guide ovals 40 on the seat carrier frame 28 and on the base frame 30 respectively.

FIG. 3 further illustrates a belt winding or retractor mechanism 42 for conversion of a linear heightwise movement of the seat carrier frame 28 relative to the base frame 30 into a rotary movement which is indicated in FIG. 3 by the double-headed arrow A. Reference numeral 44 in FIG. 3 denotes a control valve for height adjustment of the seat carrier frame 28. The control valve 44 is connected to the valve assembly 34 by way of lines 46. Reference numeral 48 denotes lines providing a connection between the valve assembly 34 and the gas spring 32 whose pressure is controllable thereby. Reference numeral 50 denotes lines for venting of the gas spring 32.

The belt mechanism 42 for converting a heightwise movement into a rotary movement comprises a flexible belt 52 which is secured by one end 54 thereof to the base frame 30. The belt mechanism 42 itself is carried on the seat carrier frame 28. In that way the belt 52 also forms a secondary belt between the seat carrier frame 28 and the base frame 30, which is capable of accommodating the high deceleration forces which occur in the event of an accident.

Still referring to FIG. 3, reference numeral 56 denotes a cam, reference numeral 58 denotes a cam shaft on which the cam 56 is carried and reference numeral 60 denotes a thrust or tappet member which bears resiliently against the cam 56, for actuating a valve lever 62. The mode of operation of the components 56 and 62 and the mode of operation of meshing gears 64 and 66 of which the gear 64 is a drive gear and the gear 66 is a driven gear will be described in greater detail hereinafter.

Reference is now made to FIG. 4 which shows further details of the belt mechanism 42 and the valve means 36 for providing for adjustment of the seat to the weight of an occupant thereof. A coupling means generally indicated at 68 is operatively disposed between the valve means 36 and the belt mechanism 42.

The belt mechanism 42 is provided for determining any heightwise position of the seat carrier frame 28 relative to the base frame 30. It is coupled by the coupling means 68 either to the valve means 36 for weight adjustment or the valve means for height adjustment. The valve means 36 for weight adjustment is provided with the cam shaft 58 to which the driven gear 66 is secured. The driven gear 66 meshes with the drive gear 64 which in turn can be connected to the belt mechanism 42 by the coupling means 68.

The belt mechanism 42 and the drive gear 64 have openings or recesses 90 and 92 which face towards each other and which are provided with equivalent internal tooth arrangements as indicated at 94 and 96. The coupling means 68 further comprises a coupling gear 98 which is displaceable on the spindle 86 along the internal tooth arrangements 94 and 96. The coupling gear 98 has an external tooth arrangement 100, which corresponds to the internal tooth arrangements 94 and 96. On the side which is towards the drive gear 64, the coupling gear 98 is acted upon by a compression spring illustrated in the form of a coil spring 102 which is concentric with respect to the spindle 86, while on the side which is towards the belt mechanism 42, the coupling gear 98 carries a bellows 104 which delimits a pressure space or chamber 106. The chamber 106 is sealed on the side remote from the bellows 104 by a sleeve 108 which is disposed on and bears against the spindle 86 and which is secured against axial sliding movement thereon. The sleeve 108 is secured against axial sliding movement on the spindle 86 by a spring ring 110 which is engaged into a peripheral groove 112 in the spindle 86. The pressure chamber 106 communicates by way of a radial passage (shown but not referenced in FIG. 4) with a passage 114 which extends axially in the spindle 86 and through which gas can be supplied to and vented from the pressure chamber 106. When gas is introduced into the pressure chamber 106 by way of the passage 114, the coupling gear is displaced towards the left in FIG. 4 from the position in which it is illustrated therein, so that the connection between the belt mechanism 42 and the drive gear 64 is interrupted. After the gas pressure in the pressure chamber 106 has been relieved, the compression spring 102, which has been compressed by virtue of the movement of the coupling gear 98 towards the left in FIG. 4, is relieved of stress by virtue of returning the coupling gear 98 back into the position shown in FIG. 4, in which the belt mechanism 42 is non-rotatably connected to the drive gear 64 in order to convert a linear heightwise movement of the seat into a rotary movement.

Figure 5:
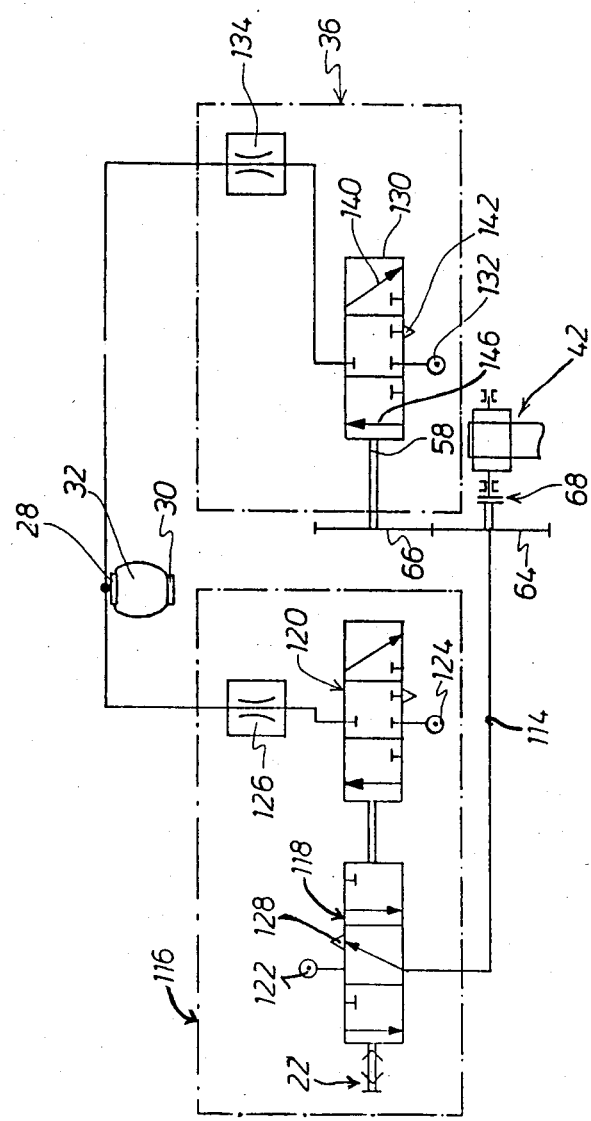

Reference will now be made to FIG. 5 showing a circuit diagram of the sprung vehicle seat support structure, diagrammatically illustrating the control or valve means 36 for adjustment of the seat to the weight of an occupant thereof, and the control or valve means 116 for adjustment of the height of the seat carrier frame relative to the base frame. The two valve means 36 and 116 are shown by blocks defined by dash-dotted lines.

In operation of the seat, when the actuating member 22 which is also shown in FIG. 1 is displaced from the rest position shown in FIG. 5 towards the right in FIG. 5, then the valve 118 is displaced towards the right in FIG. 5, jointly with the valve 120, so that the pressure source 122 is communicated with the coupling means 68 by way of the passage 114. At the same time the pressure source 124 is communicated with the gas spring 32 by way of a throttle 126. The gas spring 32 which is thus supplied with gas by way of the valve 120 and the throttle 126 is moved slowly upwardly. At the same time, the coupling means 68 is supplied with pressure gas so that the connection between the belt mechanism 42 and the drive wheel 64 is interrupted, as described above, by movement of the coupling wheel 98 towards the left in FIG. 4.

When the seat carrier frame 28 has reached the desired height relative to the base frame 30, the actuating member 22 is released so that the valves 118 and 120 return to the positions shown in FIG. 5. That means that the communication between the pressure source 124 and the gas spring 32 by way of the throttle 126 is interrupted, and the pressure in the gas spring 32 then remains unchanged. At the same time the coupling means or more precisely the pressure chamber 106 thereof is vented, by way of the vent 128 shown in FIG. 5, so that the compression spring 102 shown in FIG. 4 becomes operative and returns the coupling means 68 to the condition shown in FIG. 4. In that condition, the belt mechanism 42 is coupled to the drive gear 64 by way of the coupling means 68.

In the event of a change in the height of the seat carrier frame 28 relative to the base frame 30, in dependence on the weight of an occupant of the seat, that heightwise movement of the seat carrier frame is converted by the belt mechanism 42 into a rotary movement of the drive gear 64. That rotary movement is transmitted to the driven gear 66 which meshes with the drive gear 64, thus rotating the cam shaft 58 which is connected to the driven gear 66. That rotary movement of the cam shaft 58 causes the valve 130 in the valve means 36 to be displaced towards the left or towards the right from the neutral position shown in FIG. 5, depending on whether the seat carrier frame moves upwardly or downwardly. If the valve 130 is actuated towards the right in FIG. 5, a communication is provided between the pressure source 132 and the gas spring 32 by way of a throttle means 134. With the valve 130 in that condition, the gas spring 32 is supplied with gas from the pressure source 132 by way of the throttle 134, so that the seat carrier frame 28 produces a level compensating movement in an upward direction. A similar procedure occurs in regard to adjustment of the seat in a downward direction, in dependence on the weight of an occupant thereof. In that situation, the valve 130 is in a condition in which the passage 140 thereof communicates with the vent 142 so that the gas spring 32 is relieved of pressure therein by way of the throttle 134. As a result, the seat carrier frame 28 moves downwardly.

It will be appreciated that the above-described structure was set forth by way of example of the principles of the present invention and that further modifications and alterations may be made therein without thereby departing from the spirit and scope of the invention.

I claim:

1. A sprung vehicle seat comprising a base frame; a seat carrier frame displaceable in relation to the base frame; a gas spring disposed between said seat carrier frame and said base frame; a valve assembly for adjusting the pressure in the gas spring in dependence on the weight of the seat occupant and the desired seat height, said valve assembly comprising a first valve means for adjustment of said seat to the weight of said occupant, a second valve means for said height adjustment which is operably independent and separate from said first valve means and an actuating member for manually actuating said second valve means; an actuator means for the purposes of weight adjustment, adapted to be connected to the seat carrier frame and operable in dependence on the seat height to actuate said first valve means; and operatively disposed between said seat carrier frame and said actuator means, a coupling means adapted to couple said actuator means to said seat carrier frame to a plurality of different positions for seat height adjustment; and a belt winding means operatively disposed between said seat carrier frame and said actuator means.

2. A seat as set forth in claim 1 wherein said coupling means is disposed between said actuator means and said belt winding means.

3. A sprung vehicle seat comprising a base frame; a seat carrier frame displaceable in relation to the base frame; a gas spring disposed between said seat carrier frame and said base frame; a valve assembly for adjusting the pressure in the gas spring in dependence on the weight of the seat occupant and the desired seat height, said valve assemby comprising a first valve means for adjustment of said seat to the weight of said occupant, a second valve means for said height adjustment which is operably independent and separate from said first valve means and an actuating member for manually actuating said second valve means; an actuator means for the purposes of weight adjustment, adapted to be connected to the seat carrier frame and operable in dependence on the seat height to actuate said first valve means; and operatively disposed between said seat carrier frame and said actuator means, a coupling means comprising coaxial gears with a fine tooth pitch, said coupling means adapted to couple said actuator means to said seat carrier frame at a plurality of different positions for seat height adjustment.

4. A sprung vehicle seat comprising a base frame; a seat carrier frame displaceable in relation to the base frame; a gas spring disposed between said seat carrier frame and said base frame; a valve assembly for adjusting the pressure in the gas spring in dependence on the weight of the seat occupant and the desired seat height, said valve assembly comprising a first valve means for adjustment of said seat to the weight of said occupant, a second valve means for said height adjustment which is operably independent and separate from said first valve means and an actuating member for manually actuating said second valve means; an actuator means for the purposes of weight adjustment, adapted to be connected to the seat carrier frame and operable in dependence on the seat height to actuate said first valve means; and operatively disposed betweeen said seat carrier frame and said actuator means, a pneumatic coupling means adapted to be connected to said second valve means and also adapted to couple said actuator means to said seat carrier frame at a plurality of different positions for seat height adjustment.

* * * * *